March 1, 1966  A. A. ARSENAULT  3,237,968
CONNECTOR FOR TRAILING GOLF CARTS
Filed March 23, 1964  4 Sheets-Sheet 1
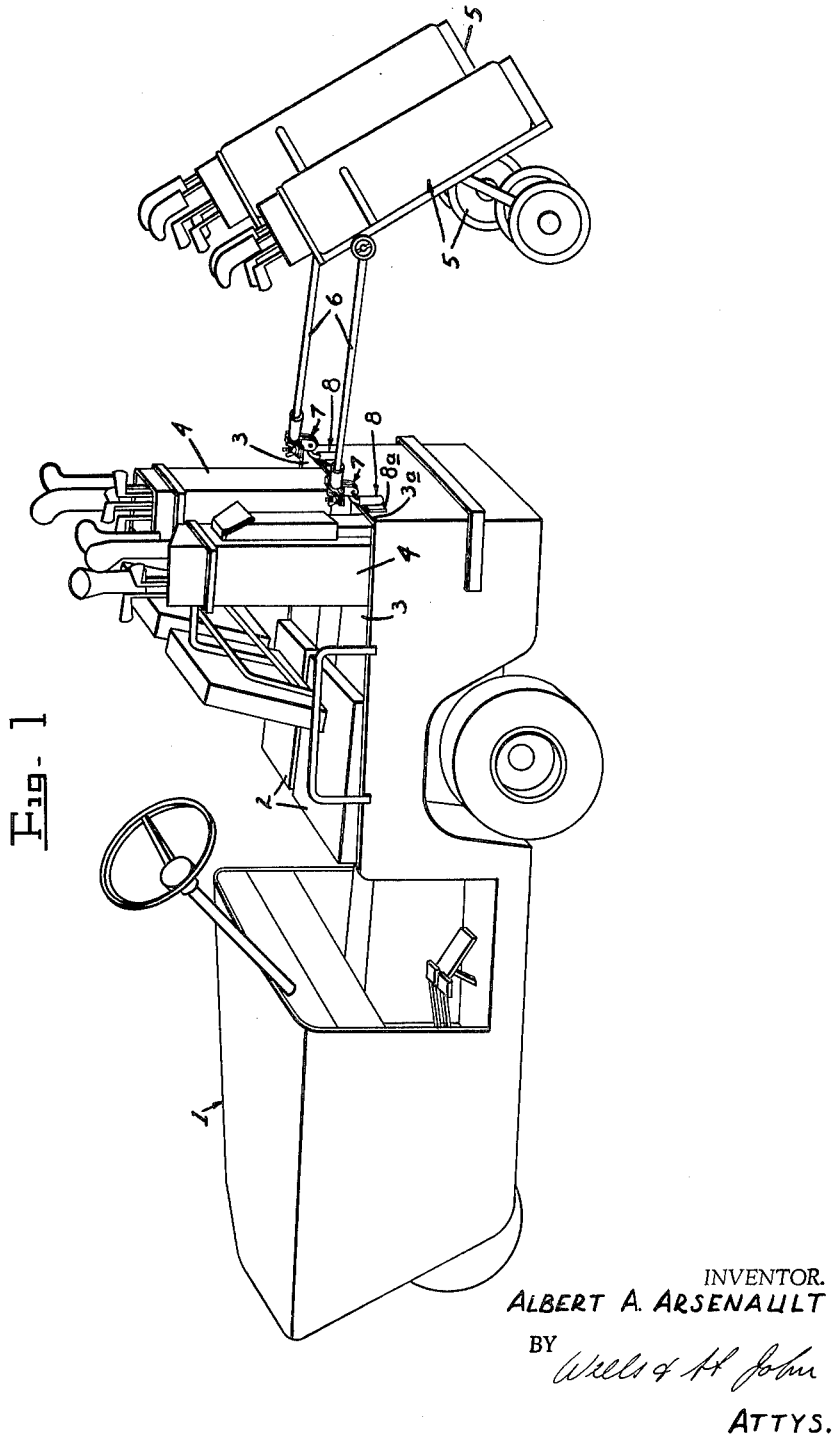
INVENTOR.
ALBERT A. ARSENAULT
BY
ATTYS.

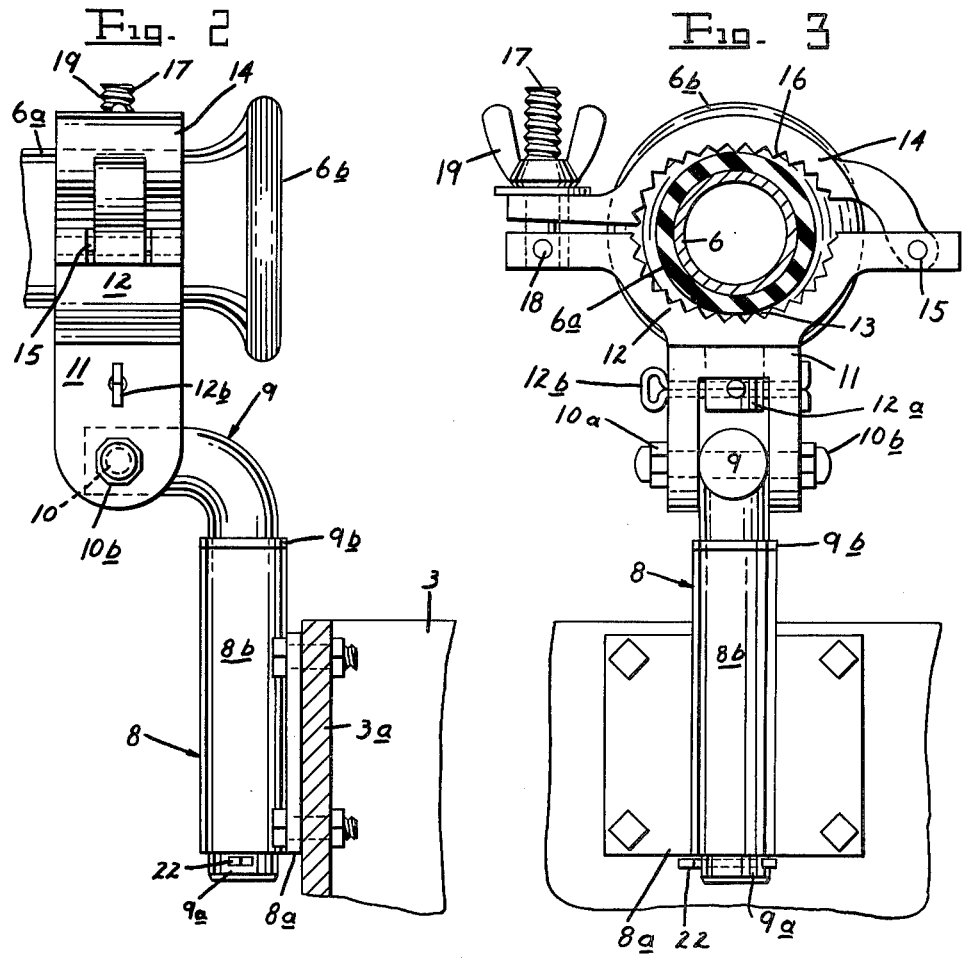
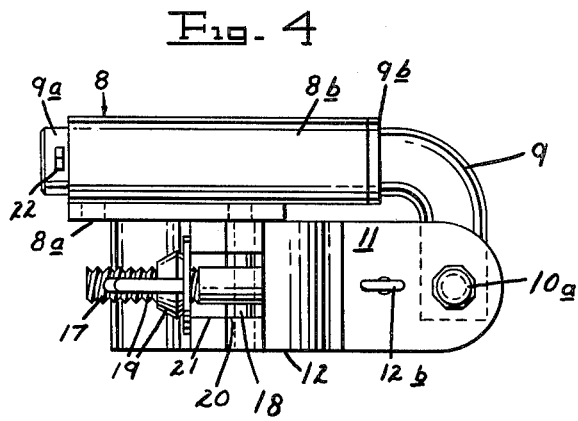

March 1, 1966 A. A. ARSENAULT 3,237,968
CONNECTOR FOR TRAILING GOLF CARTS
Filed March 23, 1964 4 Sheets-Sheet 3
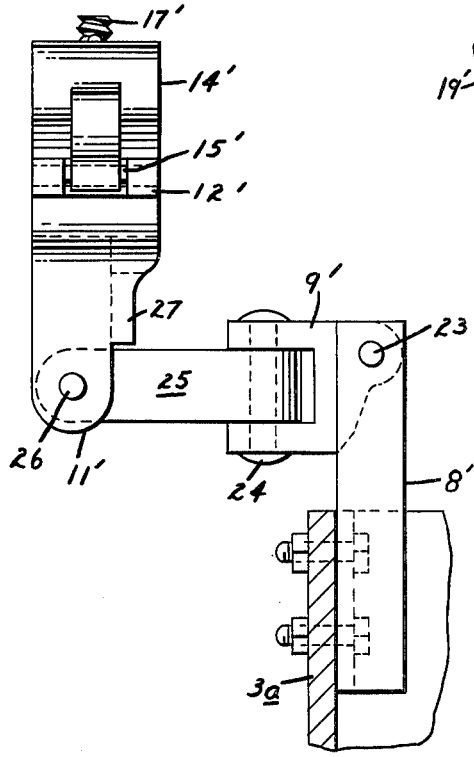
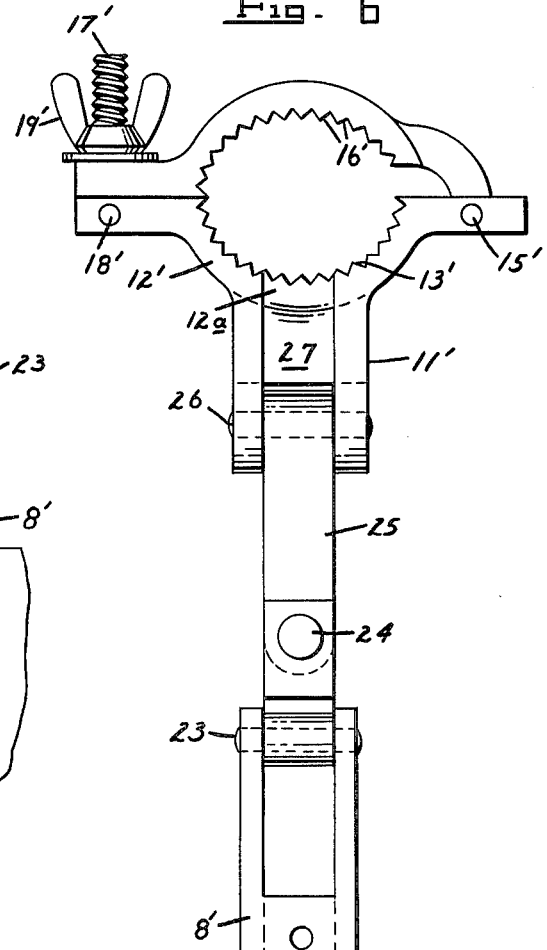
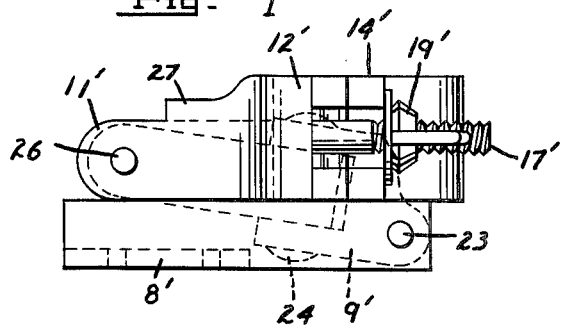
INVENTOR.
ALBERT A. ARSENAULT
BY
ATTYS.

March 1, 1966     A. A. ARSENAULT     3,237,968
CONNECTOR FOR TRAILING GOLF CARTS
Filed March 23, 1964     4 Sheets-Sheet 4
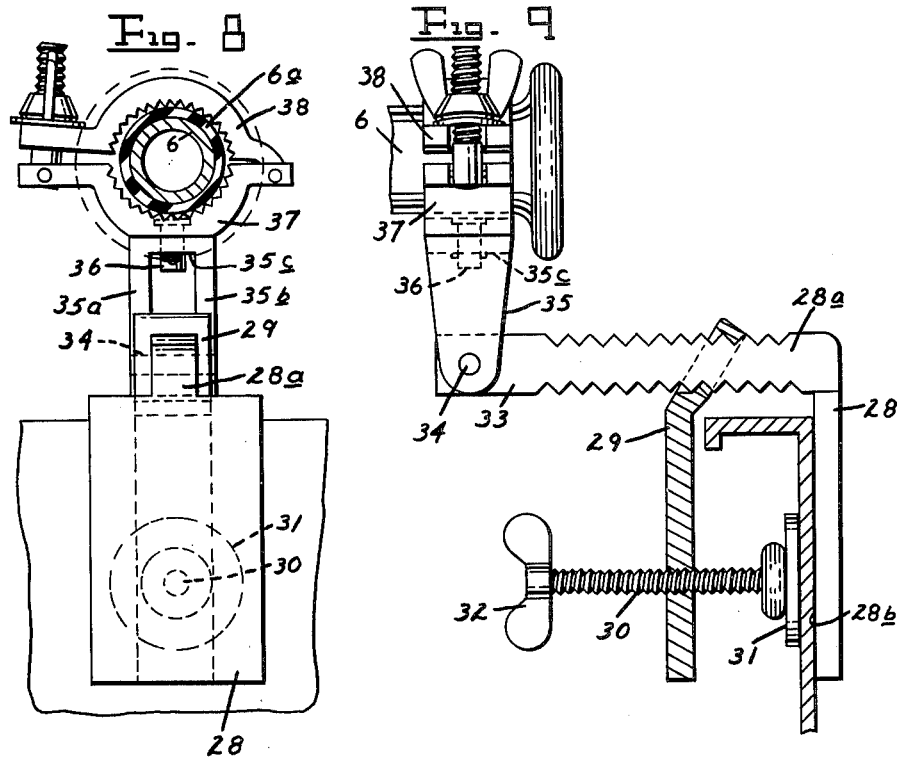
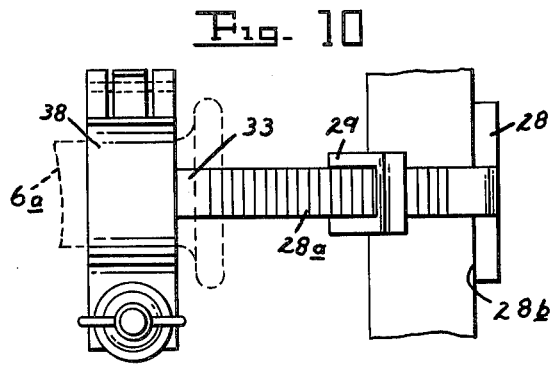
INVENTOR.
ALBERT A. ARSENAULT
BY
ATTYS.

United States Patent Office 3,237,968
Patented Mar. 1, 1966

3,237,968
CONNECTOR FOR TRAILING GOLF CARTS
Albert A. Arsenault, N. 739 Helena, Spokane, Wash.
Filed Mar. 23, 1964, Ser. No. 353,864
3 Claims. (Cl. 280—492)

The present invention relates to a connector that is particularly adapted for use in trailing handcarts for golf bags and the like behind a self-powered vehicle. The present day self-powered vehicle most used on a golf course is built for two people. Often the golfers wish to walk for the benefit of the exercise but do not like to carry the golf bag or pull the hand-pulled carts. Although the present invention may be used with any vehicle having a handle which is used to pull and steer the vehicle by hand, to connect the handle of the vehicle to a towing vehicle, it is particularly designed for use in towing hand-pulled golf bag carts behind a powered golf cart.

It is the purpose of this invention to provide a connector having a mounting bar at one end provided with means to connect it to a powered cart and having a handle receiving means at the other end to receive and hold the pull handle of a handcart, with members between the bar and the clamp, connecting them and including two pivots both having their axes at right angles to the direction of pull, one axis being upright to enable turning of the carts and the other being at right angles to the first axis so as to enable the carts to tilt fore and aft and to prevent a towed handcart from tipping over.

It is also a purpose of this invention to provide a connector of the character just described which is foldable, when released from the carts, into a compact package.

It is also a purpose of the invention to provide a connection of the character just described wherein the clamp for the handle of the handcart is offset upwardly and rearwardly from the horizontal pivot to protect the handle against damage when the remote end of either cart is raised sharply with respect to the connector.

The nature and advantages of the invention will appear more fully from the following description and the accompanying drawings illustrating a preferred embodiment of the invention and certain modified forms. The drawings and description are intended to be illustrative only and are not intended to limit the invention beyond the reasonable scope of the claims which define the invention.

In the drawings:

FIGURE 1 is a somewhat diagrammatic view showing a self-powered, two-seat golf cart or vehicle with two hand golf bag carts connected to it by connectors which embody the present invention;

FIGURE 2 is a view in side elevation of a preferred embodiment of the connector which is very simple;

FIGURE 3 is a rear face view of the connector;

FIGURE 4 is a side view showing the connector of FIGURE 2 folded up for carrying or shipment;

FIGURE 5 is a view in side elevation of a somewhat modified form of the connector;

FIGURE 6 is a rear face view of the connector shown in FIGURE 5 but with the several parts extended;

FIGURE 7 is a side view of the modified connector showing it folded up;

FIGURE 8 is a front face view partly in section of a further modification of the invention;

FIGURE 9 is a side view of the connector shown in FIGURE 8; and

FIGURE 10 is a plan view of the connector of FIGURE 8.

In FIGURE 1 of the drawings a self-powered golfers' vehicle or cart is shown. These vehicles have battery powered electric motors or internal combustion engines for their motive power. The powered vehicle 1 usually has seats 2 for two persons and rear compartments 3 for two golf bags 4. Two hand-pulled golf bag carts 5 have their handles 6 connected to the powered vehicle 1 by connectors 7. With this arrangement the foursome can play and those who wish to walk may do so without having to pull the golf bag carts 5 with them.

Referring now to FIGURES 2–4, these figures show a very simple effective connector for coupling the carts 5 to a towing vehicle 1. As shown here, the connector includes a mounting bar 8 which, as shown, includes an attaching means for securing it on the powered vehicle 1. This attaching means has a flat portion 8a adapted to be bolted to the rear wall 3a of the bag compartment 3 of the vehicle 1. This mounting bar also includes an upright sleeve portion 8b which receives and supports a mounting member which includes an upright in the form of a pivot pin 9a for a support arm 9. The pin 9a has an annular rib 9b thereon which rides on the top of the sleeve portion 8b.

At the free end of the arm 9, a pivot pin 10 is provided. This pin 10 extends in a direction at right angles to the axis of the pin 9a. Both of the pins 9a and 10 extend transversely to the rearwardly extending support arm 9. The pin 10 is shown as having a head 10a on one end and a cap nut 10b. Any suitable pin-securing means can be used. A handle carrying member in the form of an U-shaped yoke 11 is secured to the arm 9 for pivotal movement up and down in a plane which includes the upright 9a and the support arm 9 by the pivot means 10. This yoke projects from the pin and has a handle receiving cradle 12 at its free end. The cradle 12 may have a pin 12a extending through the yoke 11 and secured by a cotter pin 12b. The cradle 12 is serrated or otherwise provided with a grip surface at 13. A handle clamp 14 is pivoted to the cradle 12 by a pivot pin 15. It also has a grip surface 16 cooperating with the surface 13 to grip a golf bag cart handle 6. A bolt 17 is pivoted to the cradle 12 by a pin 18 and has a wing nut 19 to tighten the clamp. The cradle 12 and the clamp 14 are slotted as shown at 20 and 21 (FIGURE 4) so that the bolt 17 can swing out to release the handle 6. The pins 15 and 18 are driven into place and upset to permanently secure them in place. A cotter pin 22 can be used to secure the pivot pin 9a permanently in the sleeve 8b if desired so the connectors 7 will not be accidentally lost from the towing vehicle 1. The handles 6 of most golf bag carts have a hand grip 6a of resilient material with an enlarged head 6b. The construction shown is effective to avoid injury to the parts 6a and 6b by the connector.

Referring now to FIGURES 5, 6, and 7, these figures illustrate a modified form of the invention wherein the connections from the mounting bar 8' to the cradle 12' are varied somewhat and yet a compact folded-up assembly is obtained. In this form of the invention the fundamental cooperation between the mounting bar 8', the support arm 9', the yoke 11', the cradle 12' and the handle clamp 14' remains. In this form of the invention, however, the pivot pin arrangement is changed. A horizontally running pivot pin 23 connects the support arm 9' to the bar 8' and the mounting bar 8' is bifurcated as shown to permit the support arm 9' to fold between the bifurcations as illustrated in dotted lines in FIGURE 7.

The support arm 9' carries an upright pivot pin 24 which mounts an extra link 25 that is pivoted on the yoke 11' by a pivot pin 26. The parts 14'–21' are the same in construction as the parts 14–21. The yoke 11' has a cross bar 27 that serves as a stop to limit the tipping of the yoke toward the support arm 9'. This stop prevents the head 6b of the handgrip 6a on the cart handle 6 from being jammed against the arm 9'.

FIGURES 4 and 7 show how the two forms of the invention fold up into compact packages for storing and transport. To fold up the first form, the pivot pin 9a is rotated a half turn from the position shown in FIGURE 2 then the yoke 11 is turned a half turn to bring it against the portion 8a of the mounting bar 8. To fold the second form the support arm 9' is turned clockwise about its pivot 23 almost three-fourths of a turn to bring it partly into the space between the bifurcations of the mounting bar 8'. The yoke 11' is turned counterclockwise about its pivot 26 three-fourths of a turn so that the members 12' and 14' are against the bar 8'. Note that the cradle 12' is notched at 12a to receive part of the arm 9'.

Referring now to FIGURES 8-10, inclusive, these figures show a further modification of the invention which is provided with a combination of means for securing it to the towing vehicle. In this form of the invention the mounting member upright and the support arm are combined in an L-shaped bar 28. This bar has its horizontal support arm portion 28a serrated as shown to receive a clamp member 29 and to provide variable spacing between the upright portion 28b of the bar 28 and the clamp member 29. The member 29 has the threaded bolt 30 near its lower end. This bolt carries a pad 31 and has a wing head 32. This form of mounting bar assembly can be applied to powered carts having more or less thickness of top rail. The device is intended to be normally carried with the hand-drawn golf bag cart.

A supporting arm 33 is extended from the mounting bar 28. A pivot pin 34 runs horizontally at right angles to the supporting arm 33. A cradle carrying yoke 35 has its legs 35a and 35b straddling the rear end of the arm 33 and receiving the pin 34. It has a central opening in the portion 35c at its top end to receive a pivot pin 36 that is fixed to a handle receiving cradle 37 that is similar in construction to the cradle 12 of the first described form of the invention. A handle clamp 38, similar to the clamp 14 serves to secure the cart handle 6.

This form of the invention provides a connection from the mounting bar (which attaches to the towing vehicle) to the cradle and clamp (for securing the handle of the towed cart), which permits right and left and up and down swinging of the handle with respect to the mounting bar but which prevents the towed cart from turning over so long as the towing vehicle is upright. The entire connection assembly can be quickly attached to and removed from either or both vehicles.

It is believed that the nature and advantages of the invention will be clear from the foregoing description.

Having described my invention, I claim:

1. A connector adapted to connect the hand grip of a hand pulled cart to a powered vehicle, said connector comprising:
    a mounting member comprising an upright having attaching means to secure the member in upright position on the powered vehicle;
    said member comprising an L-shaped bar one leg of which comprises said upright and the other of which forms a support arm;
    said attaching means comprising a clamp adjustable along said arm and having a clamp pad facing the upright;
    a handle carrying yoke having its legs mounted on the support arm for movement up and down in a plane which includes both portions of said L-shaped bar;
    a handle receiving cradle rotatably secured on the base of the yoke to turn about an axis also in said plane; and
    means to secure said cart hand-grip on said cradle.

2. A connector adapted to connect the hand grip of a hand pulled cart to a powered vehicle, said connector comprising:
    a mounting member comprising an upright having attaching means to secure the member in upright position on the powered vehicle;
    said member including a support arm secured to and extending horizontally from the upright and rearwardly;
    a handle carrying member carried by and pivoted on the free end of said support arm and extending upwardly over the said free end and swingable on its pivot in a plane through the support arm and the upright;
    a handle receiving cradle secured on the free upper end of said handle carrying member and having a grip surface for the cart hand grip that is transverse to the handle carrying member;
    said handle carrying member comprising a yoke;
    a pivot pin pivotally connecting the legs of the yoke and the support arm;
    said cradle having a pin extending through the base of the yoke at right angles to said pivot pin;
    a hand grip clamp jaw having one end pivoted on the cradle and having a grip surface thereon cooperating with the grip surface on the cradle to hold a cart hand grip therebetween;
    and manually releasable means on the jaw and the cradle operable to tighten them on the hand grip.

3. A connector adapted to connect the hand grip of a hand pulled cart to a powered vehicle, said connector comprising:
    a mounting member comprising an upright having attaching means to secure the member in upright position on the powered vehicle;
    said member including a support arm secured to and extending horizontally from the upright and rearwardly;
    a handle carrying member carried by and pivoted on the free end of said support arm and extending upwardly over the said free end and swingable on its pivot in a plane through the support arm and the upright;
    a handle receiving cradle secured on the free upper end of said handle carrying member and having a grip surface for the cart hand grip that is transverse to the handle carrying member;
    the handle carrying member and the cradle being secured together by a pin extending axially of the handle carrying member so the cradle can turn in a direction perpendicular to said member;
    a hand grip clamp jaw having one end pivoted on the cradle and having a grip surface thereon cooperating with the grip surface on the cradle to hold a cart hand grip therebetween;
    and manually releasable means on the jaw and the cradle operable to tighten them on the hand grip.

References Cited by the Examiner

UNITED STATES PATENTS

| | | | |
|---|---|---|---|
| Re. 18,248 | 4/1932 | Hess | 280—494 |
| 817,272 | 4/1906 | Persons | 248—229 X |
| 1,720,564 | 7/1929 | Noble | 248—229 X |
| 1,735,212 | 11/1929 | Pawsat | 248—229 X |
| 1,806,773 | 5/1931 | Waters | 248—229 X |
| 2,216,584 | 10/1940 | Boden | 280—495 X |
| 2,439,623 | 4/1948 | Howells | 248—229 X |
| 2,522,255 | 9/1950 | Climo | 248—228 X |
| 2,559,981 | 7/1951 | McBride. | |
| 2,890,065 | 6/1959 | Shaffer | 280—492 |
| 3,059,713 | 10/1962 | Beggs. | |

BENJAMIN HERSH, *Primary Examiner.*

PHILIP ARNOLD, A. HARRY LEVY, *Examiners.*